United States Patent
Kobayashi et al.

(10) Patent No.: US 11,802,080 B2
(45) Date of Patent: *Oct. 31, 2023

(54) GLASS SUBSTRATE

(71) Applicant: AGC Inc., Tokyo (JP)

(72) Inventors: Yuha Kobayashi, Chiyoda-ku (JP);
Shigeto Kumano, Chiyoda-ku (JP);
Kaede Katsuno, Chiyoda-ku (JP);
Keisuke Hanashima, Chiyoda-ku (JP);
Kohei Horiuchi, Chiyoda-ku (JP)

(73) Assignee: AGC Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,372

(22) Filed: Jul. 19, 2022

(65) Prior Publication Data

US 2023/0046712 A1 Feb. 16, 2023

(30) Foreign Application Priority Data

Jul. 28, 2021 (JP) .................................. 2021-123658

(51) Int. Cl.
*B32B 3/00* (2006.01)
*C03C 23/00* (2006.01)

(52) U.S. Cl.
CPC .................. *C03C 23/0025* (2013.01)

(58) Field of Classification Search
CPC .............. B32B 3/02; C03C 23/0025
See application file for complete search history.

(56) References Cited

U.S. PATENT DOCUMENTS

| | | | |
|---|---|---|---|
| 2018/0339929 A1* | 11/2018 | Katayama | H01L 23/3107 |
| 2021/0355025 A1* | 11/2021 | Ueda | C09J 183/04 |
| 2022/0033300 A1* | 2/2022 | Seki | C03C 15/00 |

FOREIGN PATENT DOCUMENTS

| | | |
|---|---|---|
| JP | 2019-131462 A1 | 8/2019 |
| WO | WO 2018/150759 A1 | 8/2018 |

* cited by examiner

*Primary Examiner* — Elizabeth E Mulvaney
(74) *Attorney, Agent, or Firm* — Oblon, McClelland, Maier & Neustadt, L.L.P.

(57) ABSTRACT

A glass substrate 10 has a mark provided on a surface 10A of the glass substrate 10, the mark including plural dots 104, a depth H of each of the dots 104 is 0.5 μm or larger and 7.0 μm or smaller, and an inclination angle of a side surface 104B of each of the dots 104 is 5° or larger and 56° or smaller.

9 Claims, 6 Drawing Sheets

GLASS SUBSTRATE

CROSS-REFERENCE TO RELATED APPLICATIONS

The present application claims priority to and incorporates by reference the entire contents of Japanese Patent Application No. 2021-123658 filed in Japan on Jul. 28, 2021.

BACKGROUND OF THE INVENTION

1. Field of the Invention

The present invention relates to glass substrates.

2. Description of the Related Art

A glass substrate may be used as a member to support a semiconductor device in the process of manufacturing the semiconductor device. For example, as described in International Publication No. WO 2018/150759 and Japanese Unexamined Patent Application Publication No. 2019-131462, a mark may be formed on a surface of such a glass substrate by engraving through irradiation of the surface with laser light.

However, glass substrates are generally high in brittleness and fractures may be generated starting from marks engraved on surfaces of the glass substrates. Therefore, marks tend to be processed shallowly for decrease in probability of fracture. However, when a mark is made shallow for reduction of fracture, visibility of the mark and readability of the mark by a reader may be reduced. Therefore, there is a demand for suppressing fracture in glass substrates and suppressing reduction in visibility of marks thereon.

The present invention has been made in view of the above problems and an object thereof is to provide a glass substrate that enables both suppressing fracture and suppressing reduction in visibility of a mark thereon.

SUMMARY OF THE INVENTION

It is an object of the present invention to at least partially solve the problems in the conventional technology.

A glass substrate of the present disclosure comprises a mark provided on a surface of the glass substrate, the mark comprising plural dots, wherein the dots each have a depth of 0.5 μm or larger and 7.0 μm or smaller, and the dots each have a side surface having an inclination angle of 5° or larger and 56° or smaller.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Preferred embodiments of the present invention will be described in detail hereinafter by reference to the appended drawings. The present invention is not limited by these embodiments. When there are plural embodiments, the present invention also includes any combination of these embodiments. Furthermore, numerical values include those that have been rounded off and up.

Figure 1:
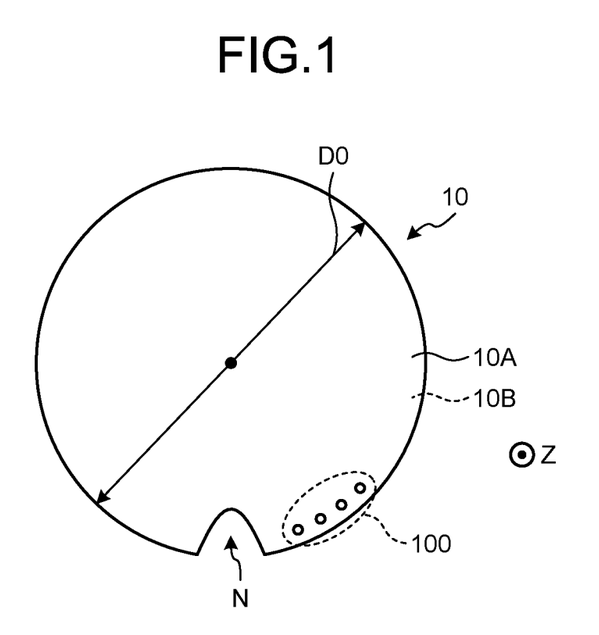
FIG. 1 is a schematic diagram of a glass substrate according to an embodiment of the present invention.

FIG. 1 is a schematic diagram of a glass substrate according to an embodiment of the present invention. A glass substrate 10 according to the embodiment is used as a glass substrate for manufacture of a semiconductor package and may be a glass substrate to support a semiconductor device. The glass substrate 10 is, more specifically, a supporting glass substrate for manufacture where a technology called fan-out wafer-level packaging (FOWLP) is used. In a case where the glass substrate 10 is rectangular, for example, the glass substrate 10 is a supporting glass substrate for manufacture where a technology called fan-out panel-level packaging (FOPLP) is used. However, the glass substrate 10 is not necessarily used to support a semiconductor device, or for FOWLP or FOPLP technology. The glass substrate 10 may be any glass substrate used to support any member. The glass substrate 10 may be glass or crystallized glass that is processed into any product, such as a cover glass for an image sensor or a substrate for a semiconductor device.

As illustrated in FIG. 1, the glass substrate 10 is a plate-like member having a surface 10A (one of its surfaces) that is one of its principal surfaces and a surface 10B (the other one of its surfaces) that is the other one of the principal surfaces, the other one being opposite to the surface 10A. The glass substrate 10 is disk-shaped such that in a planar view, that is, when the glass substrate 10 is viewed along a direction orthogonal to the surface 10A, the glass substrate 10 is circular. In other words, the glass substrate 10 is wafer-shaped. Furthermore, a notch N may be formed on a peripheral surface of the glass substrate 10 such that part of the circular outer circumference is notched. However, the glass substrate 10 is not necessarily disk-shaped and may have any shape. For example, the glass substrate 10 may be a plate having a polygonal shape, such as a rectangular shape. Furthermore, the notch N is not an essential component, and the notch N may be not formed in the glass substrate 10. The direction orthogonal to the surface 10A will hereinafter be referred to as a Z direction. The Z direction may also be said to be a thickness direction of the glass substrate 10.

(Diameter of Glass Substrate)

The glass substrate 10 has a diameter D0 that is preferably 150 mm or larger and 700 mm or smaller, more preferably 150 mm or larger and 600 mm or smaller, and even more preferably 150 mm or larger and 450 mm or smaller. As the diameter D0 is in any of these ranges, the glass substrate 10 can support a member, such as a semiconductor device adequately. The diameter D0 refers to a diameter in a case where the glass substrate 10 is circular, but in a case where the glass substrate 10 is not circular, the diameter D0 may be the maximum value of distances each between any two points on the periphery of the glass substrate 10.

(Thickness of Glass Substrate)

The glass substrate 10 has a thickness, that is, a length along the Z direction between the surface 10A and the surface 10B, the thickness being preferably 2 mm or smaller, more preferably 0.5 mm or larger and 1.8 mm or smaller, and even more preferably 0.6 mm or larger and 1.5 mm or smaller. If the thickness of the glass substrate 10 is larger than any of these ranges, handling of the glass substrate 10 at a semiconductor manufacturing apparatus will become difficult due to the increase in weight. Furthermore, if the thickness of the glass substrate 10 is smaller than any of these ranges, rigidity of the glass substrate 10 for use as a supporting member becomes too small, warpage of the glass or the semiconductor device increases, and thus the glass substrate 10 will not be suitable for use in manufacture of semiconductor devices.

(Composition of Glass Substrate)

The glass substrate 10 preferably contains the following compounds in mass percent (wt %) on an oxide basis. As the glass substrate 10 having any of the following compositions, the glass substrate 10 can support a member adequately.

$SiO_2$: preferably 40 wt % or more and 75 wt % or less, and more preferably 50 wt % or more and 75 wt % or less.

$Al_2O_3$: preferably 0 wt % or more and 20 wt % or less, and more preferably 0 wt % or more and 15 wt % or less.

$B_2O_3$: preferably 0 wt % or more and 20 wt % or less, and more preferably 0 wt % or more and 10 wt % or less.

MgO: preferably 0 wt % or more and 25 wt % or less.

CaO: preferably 0 wt % or more and 25 wt % or less, and more preferably 0 wt % or more and 15 wt % or less.

SrO: preferably 0 wt % or more and 10 wt % or less.

BaO: preferably 0 wt % or more and 20 wt % or less, and more preferably 0 wt % or more and 15 wt % or less.

$Li_2O$: preferably 0 wt % or more and 40 wt % or less.

$Na_2O$: preferably 0 wt % or more and 15 wt % or less.

$K_2O$: preferably 0 wt % or more and 10 wt % or less.

$ZrO_2$: preferably 0 wt % or more and 10 wt % or less, more preferably 0 wt % or more and 8 wt % or less, and even more preferably 0 wt % or more and 5 wt % or less.

$TiO_2$: preferably 0 wt % or more and 5 wt % or less.

$Y_2O_3$: preferably 0 wt % or more and 10 wt % or less.

(Mark)

A mark 100 that is an engraved mark has been formed on the surface 10A of the glass substrate 10. The mark 100 may be, for example, an identifier including at least one selected from a group of: a numeral; a letter; a two-dimensional code; and a graphic. The identifier may include one or more numerals, one or more letters, one or more two-dimensional codes, and/or one or more graphics. The mark 100 serving as an identifier may be a mark for identifying the glass substrate 10. The mark 100 serving as the identifier may be used for identification and management of the glass substrate 10, for example.

The mark 100 is not necessarily an identifier for identifying the glass substrate 10, and may be, for example, an alignment mark. An alignment mark is a mark for positioning the glass substrate 10, for example, and may be used in positional and/or directional alignment upon processing, such as handling, cutting, chamfering, and/or sticking, of the glass substrate 10. Furthermore, an alignment mark may be a mark for determination of the direction of the glass. That is, in layering a device on the glass substrate 10, a mark may be engraved on a surface of the glass substrate 10, the surface being opposite to a surface where the device is layered, according to change in warpage upon manufacture of the device. As a result, the direction of the warpage of the glass is able to be determined from the alignment mark. Engraving the mark on the surface opposite to the surface where the device is layered enables the identifier of the glass substrate 10 to be recognized even after the device has been layered thereon. The direction of the warpage is determined by positivity or negativity of the BOW, but may be determined for example by the amount of deflection upon support at three points. An article to be stuck to the glass may be, not be a device, but may be a thin film of metal or organic matter, a silicon semiconductor wafer, or glass, for example.

Each numeral, letter, or graphic included in the mark 100 will hereinafter be referred to as a mark element 102. That is, the mark 100 is formed of plural mark elements 102. However, the mark 100 may be formed of a single mark element 102.

Figure 2:
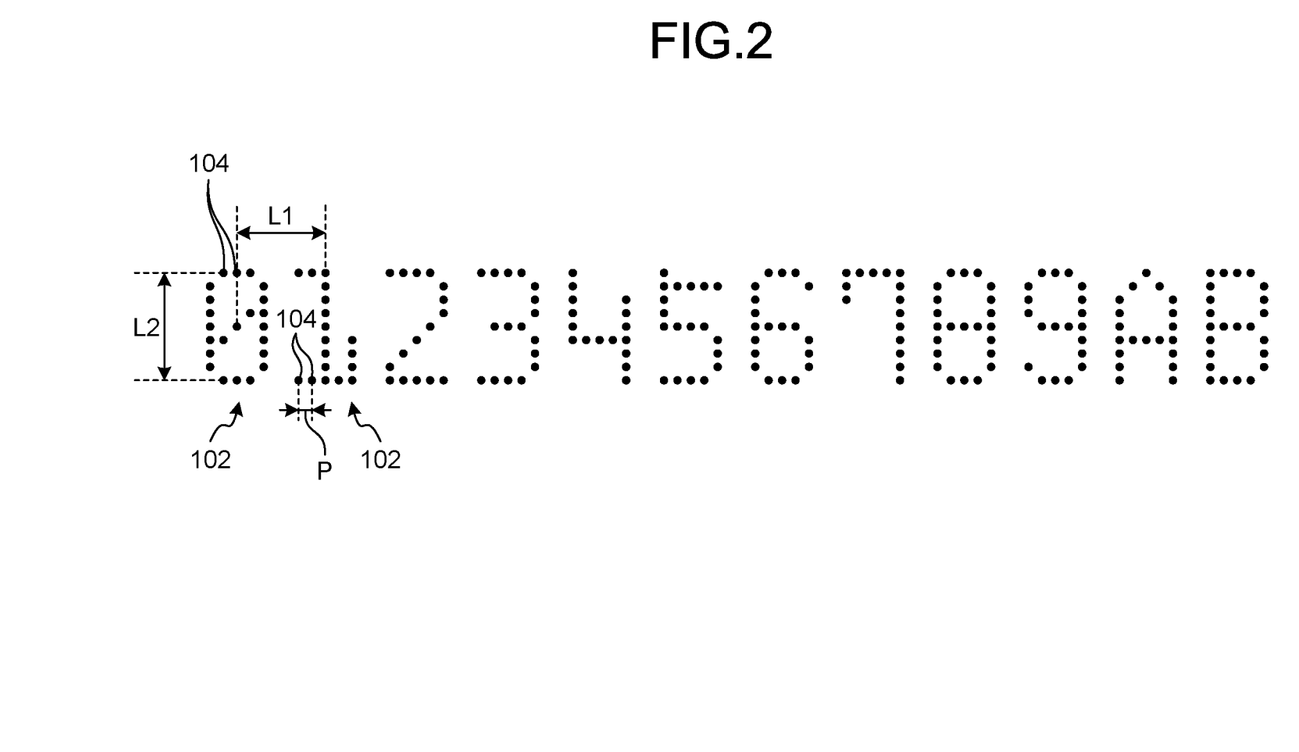
FIG. 2 is a schematic diagram of an example of a mark.

FIG. 2 is a schematic diagram of an example of a mark. In the example of FIG. 2, the mark 100 is illustrated as an identifier including twelve mark elements 102 arranged linearly in a row. However, the mark 100 is not limited to this example. For example, the mark 100 may include mark elements 102 that are arranged non-linearly. Furthermore, the mark 100 may include mark elements 102 arranged in two or more rows linearly or non-linearly.

Dimensions of the whole mark 100 are not particularly limited, but in a case where the mark 100 includes mark elements 102 arranged linearly as illustrated in FIG. 2, an interval L1 between characters may be in a range of 1.420 mm±0.025 mm and a vertical length L2 may be 1.624 mm±0.025 mm. In a case where the mark 100 includes mark elements 102 arranged non-linearly, the interval L1 between characters of the mark 100 and the vertical length L2 of the mark 100 are respectively prescribed as a length of a first side and a length of a second side of the smallest rectangle including the mark 100. The interval L1 between characters is a distance between the center of a mark element 102 and the center of another mark element 102 laterally adjacent to that mark element 102. The vertical length L2 is a distance along a vertical direction between the center of a dot 104 that is at one end of the vertical length of a mark element 102 and the center of another dot 104 that is at the other end of the vertical length of the mark element 102.

The mark elements 102 (the mark 100) are each formed of plural dots 104. In other words, plural dots 104 form a mark element 102 or the mark 100. In this embodiment, the dots 104 do not overlap one another and are formed separately from one another. A pitch P between adjacent dots 104 is prescribed by SEMI AUX015-1106 SEMI OCR CHARACTER OUTLINES or SEMI-T7-0303, and is prescribed by the font or the type of the two-dimensional code. The pitch P refers to a distance between the center of one dot 104 and the center of another dot 104 adjacent to that dot 104 in a direction along the surface 10A.

The dots 104 are generated by, for example: machining, such as laser processing or sandblasting; chemical etching; or printing. In a case where the dots 104 are formed by laser processing, a mark element 102 is formed of plural laser irradiation impressions. Sizes of the laser irradiation impressions and pitches between the laser irradiation impressions are determined by the configuration of the laser beam machine optical system.

(Dot)

Figure 3:
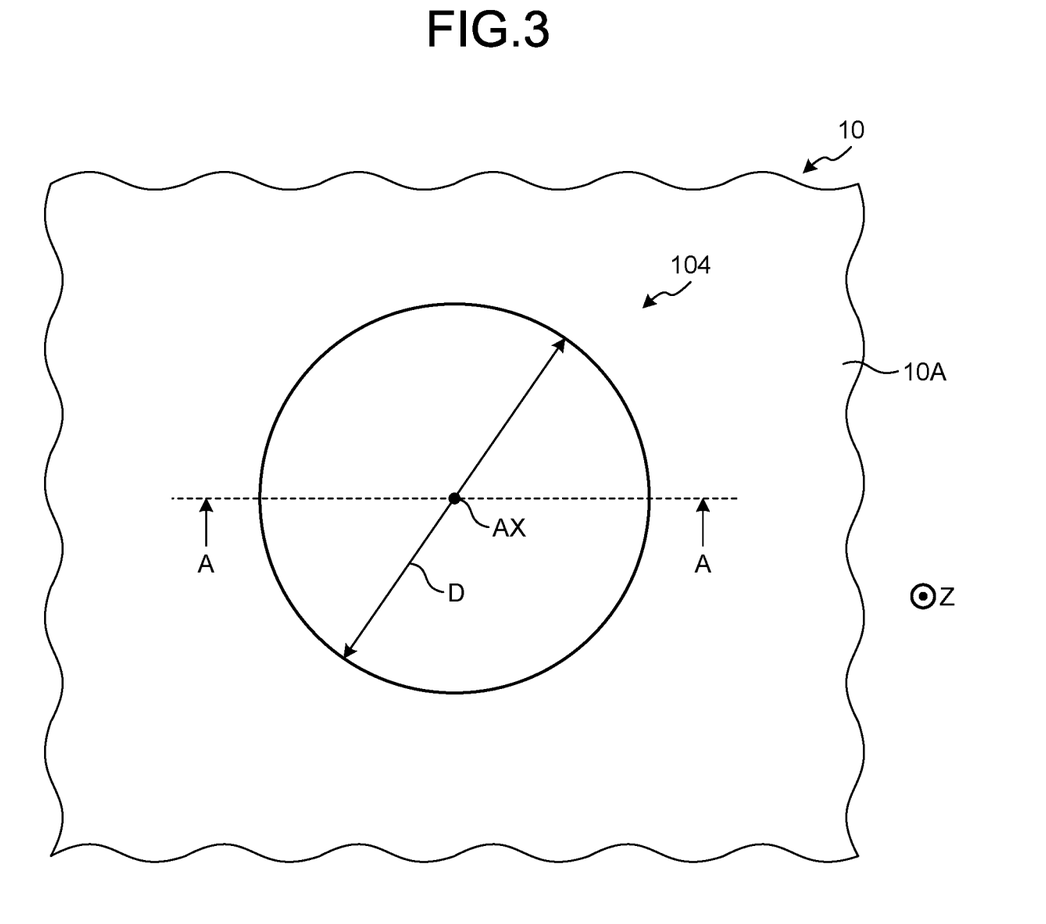
FIG. 3 is a schematic enlarged view of a portion of the glass substrate, the portion being where a dot has been formed.
Figure 4:
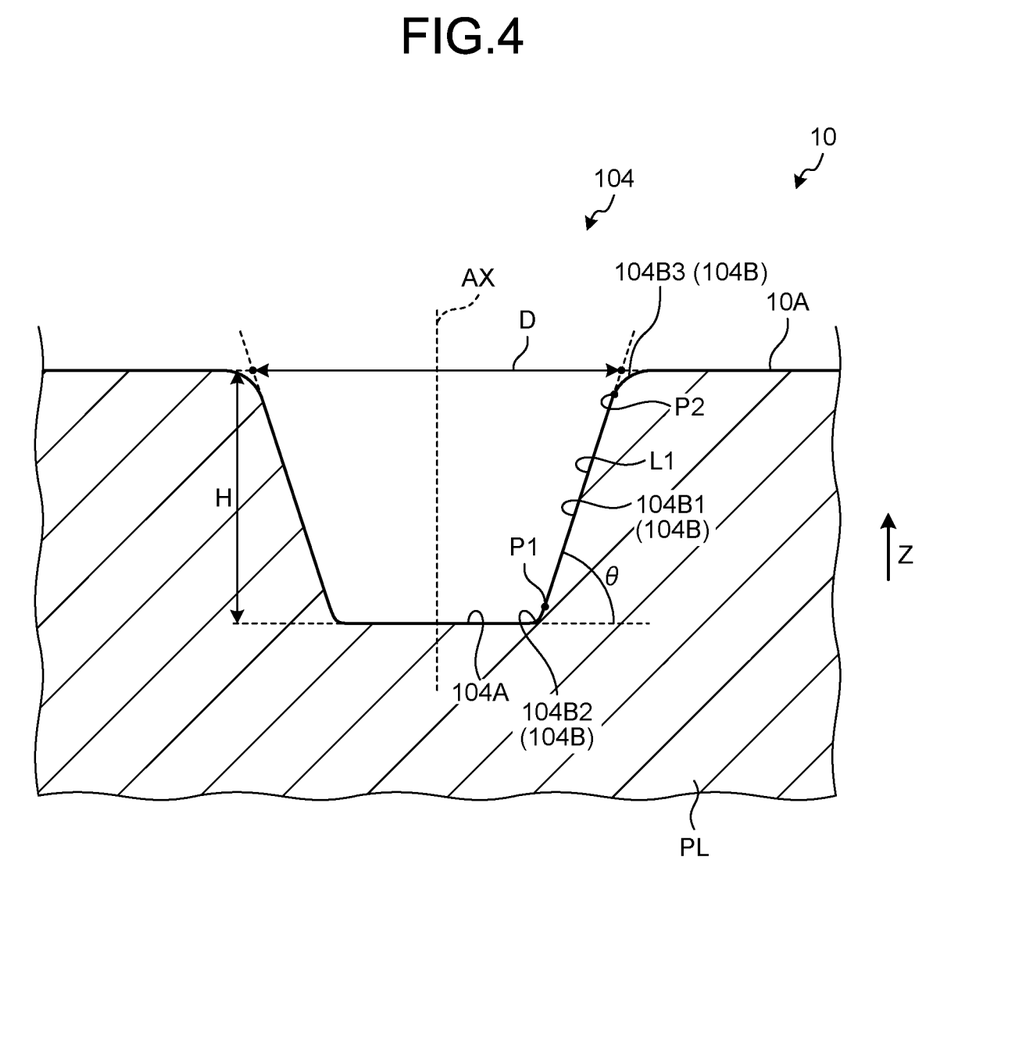
FIG. 4 is a sectional view corresponding to an A-A line in FIG. 3.

FIG. 3 is a schematic enlarged view of a portion of the glass substrate, the portion being where a dot has been formed, and FIG. 4 is a sectional view corresponding to an A-A line in FIG. 3. FIG. 4 is a sectional view of the glass substrate 10 when the glass substrate 10 is cut along a plane PL that passes the center of a dot 104 and that is along the Z direction. The dot 104 refers to a depression formed on the surface 10A of the glass substrate 10. However, the dot 104 is not necessarily depressed, that is, not necessarily concave. For example, if the dot 104 is formed by printing, the dot 104 is convex, and if the dot 104 is formed by sand blasting, the corresponding area becomes large in surface roughness and visibility of the mark 100 is thus improved. In this embodiment, the dot 104 is formed by irradiation of the surface 10A with laser light. That is, the dot 104 according to the embodiment may be said to be a laser irradiation impression (an impression formed by irradiation with laser light). A single dot 104 may be formed of plural laser irradiation impressions or a single laser irradiation impression. For greater readability achieved by the depth of a dot 104 that has been processed, the same spot may be irradiated with laser a plural number of times, or the dot 104 may be formed by irradiation of a spot shifted every time by a certain pitch. A single laser irradiation impression refers to an irradiation impression formed by one shot of laser light. That is, the dot 104 may be formed by laser light emitted over a single period from output to stoppage of the output of the laser light, or may be formed of plural laser irradiation impressions. That is, the dot 104 may be formed by laser light emitted intermittently over plural periods.

(Shape of Dot)

As illustrated in FIG. 3, the dot 104 is circular when viewed along the Z direction. However, the shape of the dot 104 as viewed along the Z direction is not necessarily circular. For example, the dot 104 may be oval when viewed along the Z direction. Furthermore, plural laser irradiation impressions may be combined to draw a ring, a rectangle, a double circle, an incomplete circle like the letter, "C", or a spiral.

As illustrated in FIG. 4, the dot 104 has a bottom surface 104A and a side surface 104B. The bottom surface 104A refers to the bottom of the dot 104, and the side surface 104B refers to a side surface connecting the bottom surface 104A of the dot 104 and the surface 10A of the glass substrate 10 to each other. The side surface 104B includes a side surface portion 104B1, a connecting portion 104B2, and a connecting portion 104B3. The side surface portion 104B1 is a portion forming the side surface of the dot 104. The connecting portion 104B2 is a portion formed at an end of the side surface portion 104B1, the end being in a direction opposite to the Z-direction. The connecting portion 104B2 connects the bottom surface 104A and the side surface portion 104B1 to each other, and has been rounded. The connecting portion 104B3 is a portion formed at the other end of the side surface portion 104B1, the other end being in the Z direction. The connecting portion 104B3 connects the side surface portion 104B1 and the surface 10A of the glass substrate 10 to each other, and has been rounded. However, the side surface 104B does not necessarily include the connecting portions 104B2 and 104B3 that have been rounded. A connecting portion between the bottom surface 104A and the side surface portion 104B1 and a connecting portion between the side surface portion 104B1 and the surface 10A of the glass substrate 10 may be edgy or angular without being rounded.

Figure 5:
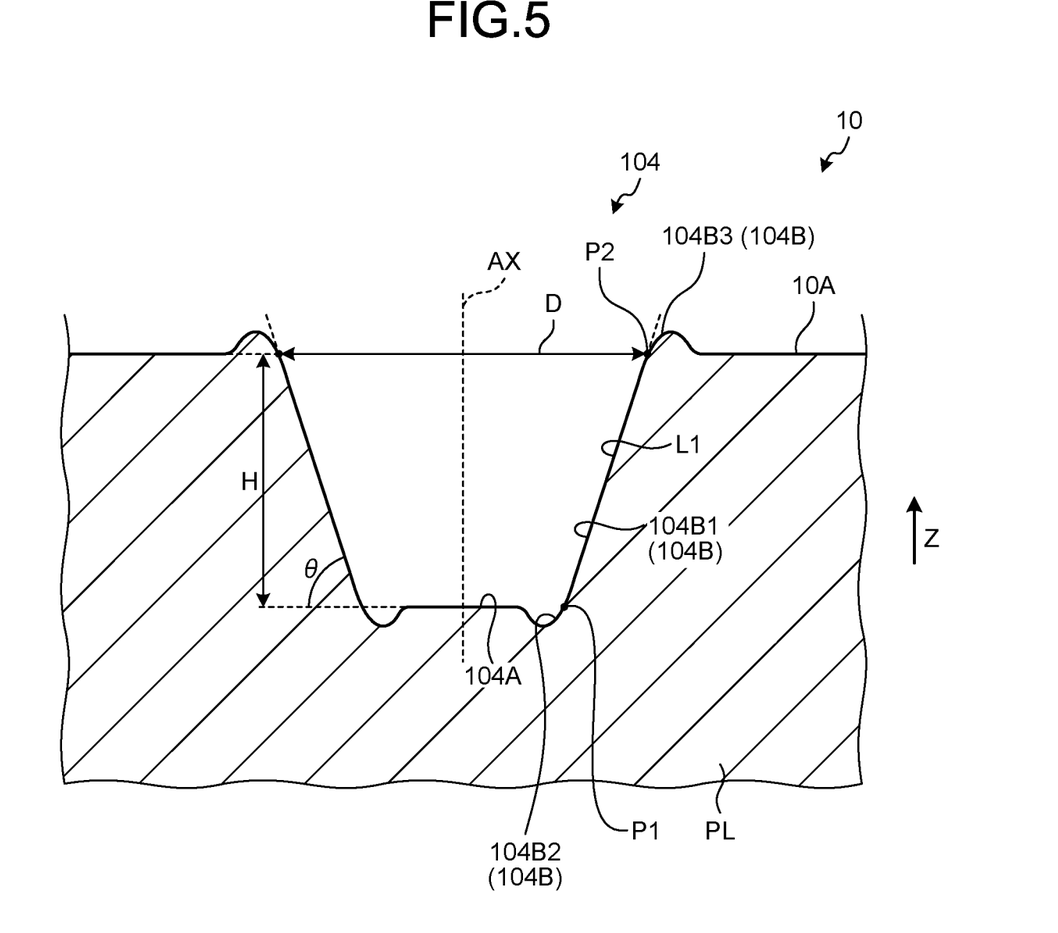
FIG. 5 is a diagram illustrating an example of another shape of the dot.
Figure 6:
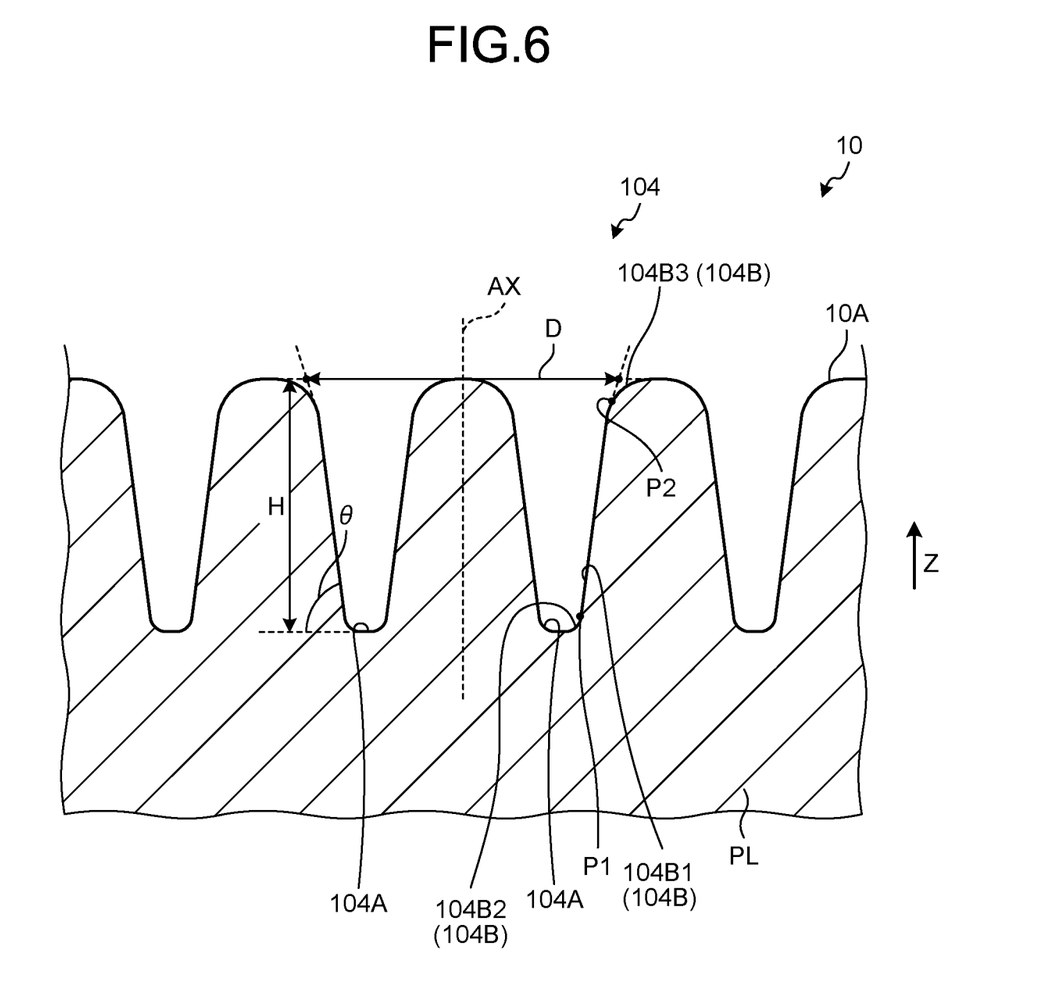
FIG. 6 is a diagram illustrating an example of another shape of the dot.

FIG. 5 and FIG. 6 are diagrams illustrating examples of other shapes of the dot 104. As illustrated in FIG. 5, depending on the quality of the glass and the quality of the laser processing, a bulge may be generated in the vicinity of the side surface 104B near the surface 10A. In a case where a central axis AX of the dot 104 along the Z direction is along an axial direction, the bulge in the vicinity of the side surface 104B may be a protrusion formed radially outside the dot 104, along the periphery of the dot 104 on the surface 10A. Furthermore, a dent may be generated in the vicinity of the side surface 104B near the bottom surface 104A. The dent in the vicinity of the side surface 104B may be a depression or ditch formed radially inside the side surface portion 104B1, along the periphery of the dot 104 on the bottom surface 104A. The bulge or the dent is preferably smaller than 50% of a depth H of the dot 104 in the Z direction, and more preferably smaller than 25% of the depth H. The bulge or the dent preferably extends over a range of 50% or less of a diameter D of the dot 104 in a radial direction of the dot 104, and more preferably extends over a range of 25% or less of the diameter D. That is, the bulge or the dent has a width (a length of the bulge or the dent along the radial direction of the dot 104) that is preferably 50% or less of the diameter D and more preferably 25% or less of the diameter D. The bulge or the dent being in any of these ranges enables readability of the mark 100 to be maintained. In particular, the bulge is desirably negligibly small. To remove the bulge after laser processing, chemical treatment using a chemical, such as hydrofluoric acid, or mechanical polishing using an abrasive or an abrasive pad may be performed. For the bulge, only a region around the dot 104 may be locally processed or the whole substrate may be processed uniformly. A region processed for removal of the bulge desirably has surface roughness equivalent to that of the whole substrate, but surface roughness of a region around the engraved mark may be made smaller to reduce scatter of irradiation light from a reader and thereby facilitate reading. Furthermore, in a case where visibility of a singular circle is insufficient, a shape, such as a double circle, may be adopted as illustrated in FIG. 6. In any of these cases, to avoid concentration of stress and maintain strength of the glass substrate 10, steep changes in shape are preferably minimized.

(Diameter of Dot)

The diameter D of the dot 104 is preferably 50 µm or larger and 200 µm or smaller, more preferably 80 µm or larger and 150 µm or smaller, and even more preferably 90 µm or larger and 120 µm or smaller. The diameter D of the dot 104 being in any of these ranges enables the single dot 104 to be comparatively large and the mark 100 to be adequately visible. As illustrated in FIG. 4, the diameter D of the dot 104 may refer to the diameter of an imaginary circle formed by intersection between: a curved surface (corresponding to a side surface of a truncated cone) along the side surface portion 104B1; and a plane along the surface 10A. Furthermore, in a case where the dot 104 is not circular, the diameter D may be the longest distance between two points on the periphery of an imaginary area formed by intersection between: a plane along the side surface portion 104B1; and the plane along the surface 10A.

(Depth of Dot)

The depth H of the dot 104 is preferably 0.5 µm or larger and 7.0 µm or smaller, more preferably 0.5 µm or larger and 5.0 µm or smaller, and even more preferably 0.5 µm or larger and 3.0 µm or smaller. The depth H being in any of these ranges enables fracture starting from the dot 104 of the glass substrate 10 to be suppressed, and enables readability of the mark 100 to be maintained. The depth H refers to a distance between the surface 10A and the bottom surface 104A in the Z direction.

The depth H of the dot 104 is measured by the following method. The shape of a cross section of any dot of a mark is measured using a laser microscope. Where the lowest point of the cross section is denoted by S, a difference along the Z direction between the surface 10A that is a principal surface of the glass substrate 10 and the lowest point S is thereafter determined as the depth H. However, in a case where the dot 104 has the dent as illustrated in FIG. 5, the dent on the periphery of the bottom of the dot 104 may be not regarded as the lowest point. The depth H may be measured by OLS4000 manufactured by Olympus Corporation.

Furthermore, where deviation of the depth H of the bottom is denoted by ΔH, the depth H excluding the dent generated radially inside the side surface portion 104B1, ΔH is desirably 50% or less of the depth H and more desirably 25% or less of the depth H.

(Surface Roughness of Bottom Surface of Dot)

The bottom surface 104A of the dot 104 has an arithmetic average roughness Ra prescribed by JIS B 0601:2001, the arithmetic average roughness Ra being preferably 0.1 μm or smaller, more preferably 0.01 μm or larger and 0.1 μm or smaller, and even more preferably 0.01 μm or larger and 0.05 μm or smaller. Furthermore, the bottom surface 104A of the dot 104 has a maximum height Rz prescribed by JIS B 0601:2001, the maximum height Rz being preferably 1 μm or smaller, and more preferably 0.01 μm or larger and 0.5 μm or smaller. The surface roughness of the bottom surface 104A being in any of these ranges enables fracture starting from a microscopic crack in the mark 100 of the glass substrate 10 to be prevented, and enables the mark 100 to be easily read. If the surface roughness exceeds any of these ranges too much, underlying microscopic cracks may reduce the fracture stress of the engraved mark and may cause fracture of the glass substrate starting from the engraved mark. On the contrary, if the surface roughness is smaller than any of these ranges, reference light for reading of the engraved mark may be unable to be scattered and reflected adequately and the engraved mark may fail to be read. The arithmetic average roughness Ra and the maximum height Rz are calculated by sampling of just a reference length. The reference length may be, for example, 30 μm. Furthermore, the arithmetic average roughness Ra and the maximum height Rz may be measured by OLS4000 manufactured by Olympus Corporation. In this measurement, the magnification of the objective lens is 50.

(Surface Roughness of Side Surface Portion of Dot)

The arithmetic average roughness Ra prescribed by JIS B 0601:2001 of the side surface portion 104B1 of the dot 104 is preferably 1 μm or smaller, more preferably 0.1 μm or smaller, and even more preferably 0.01 μm or larger and 0.05 μm or smaller. The surface roughness of the side surface 104B1 being in any of these ranges enables adequate reflection of light and thus suppressing reduction in visibility of the mark 100 even in a case where the depth H of the dot 104 is made comparatively shallow to be in any of the above described ranges. The arithmetic average roughness Ra of the side surface portion 104B1 is calculated by sampling of just a reference length from a roughness curve of the side surface portion 104B1. The reference length may be, for example, 30 μm.

(Inclination Angle of Side Surface of Dot)

The dot 104, according to this embodiment, decreases in diameter toward the bottom surface 104A. The side surface 104B of the dot 104 has an inclination angle θ of preferably 5° or larger and 56° or smaller, more preferably 5° or larger and 55° or smaller, and even more preferably 15° or larger and 55° or smaller. The inclination angle θ being in any of these ranges enables adequate reflection of light and thus suppressing reduction in visibility of the mark 100 even in a case where the depth H of the dot 104 is made comparatively shallow to be in any of the above described ranges. The inclination angle θ exceeding any of these ranges too much may cause difficulty of reading of the mark because the reflection area relative to incidence of light from the light source for reading of the mark becomes too small, the light coming from the principal surface. This inclination angle θ refers to an angle formed between the bottom surface 104A and the side surface 104B of the dot 104 and may be said to be the gradient of the dot 104. The inclination angle θ may be said to be an angle formed between: a line segment LI extending on the side surface portion 104B1 and along the plane PL; and the bottom surface 104A. More specifically, the line segment LI may be said to be a straight line extending from a position P1 to a position P2 on the side surface 104B, the line segment LI also being along the plane PL. The position P1 refers to a position separate from the bottom surface 104A by a distance that is 20% of the depth H in the Z direction. The position P2 refers to a position on the side surface 104B, the position being separate from the bottom surface 104A by a distance that is 80% of the depth H, in the Z direction. In the example of FIG. 4, the position P1 is at the boundary between the side surface portion 104B1 and the connecting portion 104B2, and the position P2 is at the boundary between the side surface portion 104B1 and the connecting portion 104B3.

(Method of Manufacturing Glass Substrate)

A method of manufacturing the glass substrate 10 according to the embodiment includes a preparing step of preparing a glass plate that is a glass substrate on which the mark 100 has not been formed yet, and an irradiating step of irradiating a surface of the glass plate with laser light to form the mark 100 and manufacture the glass substrate 10. At the preparing step, raw materials for glass are brought into a vitreous state by any glass melting forming method, such as a float method, a fusion method, or an ingot forming method, to manufacture a glass plate, and thereafter, the glass plate is processed into a shape of the glass substrate. Because the glass substrate 10 that is an example of the embodiment is disk-shaped, glass is cut out into a circular shape to form a circular glass plate by any means, such as, for example, slicing or circular cutting. The glass plate cut out into a circular shape is subjected to end face chamfering and surface grinding and polishing, then to a cleaning and inspection process, and the preparing step is thereby completed. At the irradiating step, a process of forming a dot 104 by irradiation of the surface of the glass plate is repeated to form the mark 100 formed of a plurality of the dots 104 on the surface of the glass plate.

At the irradiating step, laser light is emitted to the glass surface to form the dots 104. A light source having a wavelength of 193 nm is used, for example, and laser light is emitted from the light source to the glass surface via various optical devices. The spot diameter is adjusted by the optical system such that the dot diameter becomes about 100 μm. The glass surface is moved in an X direction and a Y direction using a scanner but an X-Y stage may be used instead, for example.

(Effect)

As described above, the mark 100 formed of the plural dots 104 is provided on the surface 10A of the glass substrate 10 according to the embodiment. The depth H of each of the dots 104 is 0.5 μm or larger and 7.0 μm or smaller and the inclination angle θ of the side surface 104B of the dot 104 is 5° or larger and 56° or smaller. The depth H of the dot 104 being in this range enables suppressing fracture starting from the dot 104 in the glass substrate 10 according to the embodiment. Yet, just decreasing the depth H of the dot 104 in this way may reduce visibility of the mark 100. However, by setting the inclination angle θ of the dot 104 in the above range, the glass substrate 10 according to the embodiment enables light to be adequately reflected at the dot 104 and reduction in visibility of the mark 100 to be suppressed. That is, by being the depth H to be 0.5 μm or larger and 7.0 μm or smaller and being the inclination angle θ to be 5° or larger and 56° or smaller, the glass substrate 10 according to the embodiment enables suppressing fracture starting from the dot 104 and suppressing reduction in visibility of the mark 100.

The depth H of the dot 104 is more preferably 0.5 μm or larger and 5.0 μm or smaller and the inclination angle θ of the side surface 104B of the dot 104 is more preferably 5° or larger and 55° or smaller. The depth H and the inclination angle θ being in these ranges enables adequate suppression fracture starting from the dot 104 and adequate suppression of reduction in visibility of the mark 100.

The arithmetic average roughness Ra prescribed by JIS B 0601:2001 of the bottom surface 104A of the dot 104 is preferably 0.1 μm or smaller. The arithmetic average roughness Ra of the bottom surface 104A being in this range enables even more adequate suppression of fracture starting from the dot 104.

The arithmetic average roughness Ra prescribed by JIS B 0601:2001 of the bottom surface 104A of the dot 104 is more preferably 0.01 μm or larger and 0.1 μm or smaller. Setting the arithmetic average roughness Ra of the bottom surface 104A in this range enables even more adequate suppression of fracture starting from the dot 104.

The diameter D of the dot 104 is preferably 50 μm or larger and 200 μm or smaller. Making the diameter D of the dot 104 that is a minimum unit of the mark 100 comparatively large in this range enables adequate reflection of light at the dot 104 and suppression of reduction in visibility of the mark 100.

The mark 100 is preferably at least one of an identifier and an alignment mark. Forming the mark 100 serving as the identifier and/or the alignment mark from the dots 104 as described above enables adequate suppression of reduction in visibility of the identifier and/or the alignment mark.

The mark 100 is preferably used to determine the direction of warpage of the glass substrate 10. The mark 100 having the shape according to the embodiment is suitable for determination of the direction of warpage of the glass substrate 10.

Furthermore, the glass substrate 10 is preferably circular or rectangular. The glass substrate 10 being circular or rectangular enables a semiconductor device to be supported adequately by the glass substrate 10.

Furthermore, the glass substrate 10 is preferably used as a glass substrate to support a semiconductor device. Because breakage from the mark 100 on the glass substrate 10 is able to be minimized, the glass substrate 10 is suitable as a glass substrate to support a semiconductor device.

EXAMPLES

Some examples will be described next. Table 1 is a table listing some examples.

TABLE 1

| | Conditions | | | | | | | |
|---|---|---|---|---|---|---|---|---|
| Example | Wavelength of laser for engraving | Shape | Diameter (μm) | Depth (μm) | Angle (°) | Ra (μm) | Rz (μm) | Evaluation Result |
| 1 | 193 nm | | 100 | 0.5 | 17.4 | 0.01 | 0.05 | Pass |
| 2 | | | 100 | 0.6 | 23.8 | | | Pass |
| 3 | | | 100 | 2.4 | 33.0 | 0.04 | 0.19 | Pass |
| 4 | | | 100 | 4.2 | 50.9 | 0.09 | 0.48 | Pass |
| 5 | 532 nm | | 100 | 2.3 | 63.5 | Unmeasurable | | Fail |
| 6 | | | 100 | 3.8 | 56.3 | Unmeasurable | | Fail |
| 7 | | | 100 | 5.0 | 44.4 | Unmeasurable | | Pass |

First Example

In First Example, an EN-A1 glass substrate having a diameter of 300 mm and a thickness of 1.0 mm was prepared. A dot was formed by irradiation of a surface of the glass substrate with laser light of a wavelength of 193 nm a plural number of times. The dot had a diameter of 100 μm and a depth of 0.5 μm, a bottom surface of the dot had an arithmetic average roughness Ra of 0.01 μm, and a side surface of the dot had an inclination angle of 17.4°. The depth and angle of the dot, and the arithmetic average roughness Ra and the maximum height Rz of the bottom surface were measured by a laser microscope and a measurement length for the arithmetic average roughness Ra and the maximum height Rz was 30 μm.

Second Example to Fourth Example

In Second Example to Fourth Example, using the same settings and same glass as First Example, laser processing was performed by adjustment of the numbers of shots for larger depths of the dots. The same conditions as First Example were used, except that the depth, inclination angle, the arithmetic average roughness Ra, and the maximum height Rz for the dot in each of these examples were set at those listed in Table 1.

In Second Example, a bulge in the vicinity of the side surface was measured, and the bulge had a height of 0.5 μm and a width of 15 μm. Furthermore, a dent formed radially inside the side surface was measured, and the dent had a height (depth) of 0.4 μm and a width of 15 μm. The height of the bottom had a variation ΔH of 0.4 μm.

Fifth Example to Seventh Example

In Fifth Example to Seventh Example, laser of a wavelength of 532 nm was used to form plural laser irradiation impressions each having a diameter of 10 μm, thereby forming a dot having a double circle shape with an outer diameter of 100 µm. The depth, inclination angle, arithmetic average roughness Ra, and maximum height Rz for the dot were set at those listed in Table 1.

(Evaluation)

In evaluation, light of a predetermined intensity was emitted to the vicinity of the mark on the glass surface from a position at an elevation angle of 70 degrees, and reflected light of that light was read by a reader (Insight 1742 manufactured by COGNEX Corporation) installed at a position at an elevation angle of 90 degrees. In the evaluation, if the engraved mark was successfully read by the reader, the result was recorded as a pass indicating that the reflected light was able to be read and if the engraved mark was unable to be read by the reader, the result was recorded as a fail indicating that the reflected light was unable to be read.

In the First to Fourth Examples and Seventh Example which are working examples, the reflected light was readable and reduction in visibility of the mark was able to be minimized. In contrast, in the Fifth Example and Sixth Example which are comparative examples, the element to reflect the irradiation light for reading is lacking due to the large inclination angle (elevation angle), the reflected light is unable to be read, and visibility of the mark is thus reduced. In the working example, Seventh Example, the depth of the engraved mark was sufficiently large at 5 µm or larger and the reflected light was thus read successfully.

The present disclosure enables both suppressing fracture and suppressing reduction in visibility of mark.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A glass substrate, comprising:
    a mark provided on a surface of the glass substrate, the mark comprising plural dots, wherein
    the dots each have a depth of 0.5 µm or larger and 7.0 µm or smaller, and
    the dots each have a side surface having an inclination angle of 5° or larger and 56° or smaller.

2. The glass substrate according to claim 1, wherein
    the depths of the dots are each 0.5 µm or larger and 5.0 µm or smaller, and
    the inclination angles of the side surfaces of the dots are each 5° or larger and 55° or smaller.

3. The glass substrate according to claim 1, wherein the dots each have a bottom surface having an arithmetic average roughness Ra of 0.1 µm or smaller, the arithmetic average roughness Ra being prescribed by JIS B 0601:2001.

4. The glass substrate according to of claim 1, wherein an arithmetic average roughness Ra prescribed by JIS B 0601:2001 of a bottom surface of each of the dots is 0.01 µm or larger and 0.1 µm or smaller.

5. The glass substrate according to claim 1, wherein the dots each have a diameter of 50 µm or larger and 200 µm or smaller.

6. The glass substrate according to claim 1, wherein the mark is at least one of an identifier and an alignment mark.

7. The glass substrate according to claim 1, wherein the mark is used to determine a direction of warpage of the glass substrate.

8. The glass substrate according to claim 1, wherein the glass substrate is circular or rectangular.

9. The glass substrate according to claim 1, wherein the glass substrate is used as a glass substrate to support a semiconductor device.

\* \* \* \* \*